United States Patent [19]

Schöllkopf et al.

[11] Patent Number: 5,192,388

[45] Date of Patent: Mar. 9, 1993

[54] PROCESS AND DEVICE FOR PRODUCING A COMPOSITE WEB

[75] Inventors: Ernst Schöllkopf, Rechthalten; Walter Rimmele, Freiburg; Roland Stiwitz, Dudingen; Konrad Vogel, Bern, all of Switzerland

[73] Assignee: Maschinenfabrik Polytype A.G., Freiburg, Switzerland

[21] Appl. No.: 686,417

[22] Filed: Apr. 16, 1991

[30] Foreign Application Priority Data

Apr. 17, 1990 [EP] European Pat. Off. ............ 98010299

[51] Int. Cl.⁵ .............................................. B32B 31/06
[52] U.S. Cl. .................................... 156/324; 156/243; 156/359; 156/555
[58] Field of Search ............... 156/243, 324, 242, 555, 156/578, 359, 209

[56] References Cited

U.S. PATENT DOCUMENTS

| | | |
|---|---|---|
| 3,863,908 | 2/1975 | Charpentier . |
| 4,240,857 | 12/1980 | DellaVecchia et al. ............ 156/209 |
| 4,297,408 | 10/1981 | Stead et al. ....................... 156/324 X |
| 4,302,269 | 11/1981 | Steinberg et al. ................. 156/324 X |
| 4,305,622 | 12/1981 | Krumm ............................ 156/243 X |
| 4,498,946 | 2/1985 | Schollkopf et al. ................ 156/324 |

FOREIGN PATENT DOCUMENTS

| | | |
|---|---|---|
| 0109924 | 8/1983 | European Pat. Off. . |
| 0136510 | 8/1984 | European Pat. Off. . |
| 3207298A1 | 3/1982 | Fed. Rep. of Germany . |
| 7924089 | 9/1979 | France . |

*Primary Examiner*—Jeff H. Aftergut
*Attorney, Agent, or Firm*—McGlew and Tuttle

[57] ABSTRACT

A substrate web (1), which is to be laminated on both sides with laminating webs (10) and (18), is brought together with and joined to a laminating web (10) coated with an adhesive film (8) in a roller gap (2) formed by two counterrollers (3) and (4). The other side of the substrate web (1) receives an adhesive film (9) from the second counterroller (4) in the roller gap (2). The second laminating web (18) is brought together with and bonded to the side of the substrate web (1), which side is coated with the adhesive film (9), in a roller gap (16) formed by a first laminating roller (15) and a second laminating roller (17).

5 Claims, 2 Drawing Sheets

PROCESS AND DEVICE FOR PRODUCING A COMPOSITE WEB

FIELD OF THE INVENTION

The present invention pertains to a process for producing a composite web, in which sides of a substrate web which are to be laminated, and a laminating web are brought together and bonded by means of an adhesive layer from an adhesive applicator. Each of the webs forming part of the composite web is deflected by corresponding rollers from its direction of feed before being brought together with one of the other webs, and the webs are supported without interruption by roller surfaces until the composite web is finished. The invention pertains as well as to a device for carrying out the process.

BACKGROUND OF THE INVENTION

Such processes for producing a composite web have been known. For example, European Patent Specification No. EP-PS 0,109,924 discloses a process in which a substrate web is coated on both sides with an adhesive. The substrate web thus coated is then sent via one of the two applicator rollers, which together form a first roller gap, to a second roller gap, which is formed by an applicator roller and a first laminating roller. In the second roller gap, the substrate web is bonded to a laminating web fed in via the first laminating roller. The two webs bonded together are subsequently passed over the first laminating roller in a third roller gap which is formed by a second laminating roller and a first laminating roller. Via the second laminating roller, a second laminating web is fed in, and is bonded in the third roller gap to the other two webs already bonded together to form a triple composite web.

Using this process, it is possible to use many types of composite webs with different materials of the substrate web and the laminating web, as well as adhesives that are adapted to these materials, of which the different webs consist. The thicknesses of the webs may also be different. The adhesive layer thicknesses can be adjusted to the actual needs.

Since no rolling behavior may occur in the finished composite web, it is necessary to control the tensions of all webs. This web tension control depends to a great extent on the temperatures affecting the web, at which the adhesives must be processed.

A defined adhesive, which must be processed at its characteristic temperature and at a viscosity that depends on this temperature, is required whenever two webs, which consist of different materials and may have greatly different thicknesses, are to be joined. The above-described process does not make it possible to join a substrate web on both sides with a laminating web, which webs consist of different materials and for which adhesives with greatly different processing temperatures must be used. Until the adhesive-coated substrate web is joined with the laminating webs, the two have adapted themselves to different adhesive temperatures, so that optimal temperatures and consequently optimal viscosities will no longer prevail at the connection site to the laminating web. This may affect the quality of the junction.

This process also fails to provide for application of an adhesive layer to the web which would be best suited by virtue of the material properties and the surface structure. The adhesive is always applied to the substrate web, and this can also affect the amount of adhesive applied.

SUMMARY OF THE INVENTION

It is an object of the present invention is to further improve the prior-art process for producing a composite web such that it will become possible to bond a substrate web on its two sides to different laminating webs such that the adhesives are present at the connection site in the optimal form in terms of temperature and viscosity.

According to the invention, an apparatus and a process is provided for producing a composite web in which each side of a substrate web, which sides are to be laminated, and a laminating web are brought together and bonded together by means of an adhesive layer from an adhesive applicator mechanism. Each of the webs which form part of the composite web is deflected from their direction of feed by corresponding rollers prior to being brought together with one of the other webs and each of the webs is supported without interruption by roller surfaces until the composite web is finished. The process includes bringing the substrate web together with and bonding it to at least one laminating web in a first roller gap wherein the first roller gap is formed by a first counterroller and a second counterroller. The laminating web is then introduced in an adhesive applicator mechanism into a roller gap which is formed by the first counterroller and an applicator roller of the adhesive applicator mechanism. The applicator roller is engaged with the first counterroller. The laminating web then receives an adhesive layer from the applicator roller. The adhesive layer being introduced into the roller gap around the counterroller.

This process using the apparatus of the invention makes it possible to coat the laminating webs, which is advantageous when by virtue of its surface structure, the laminating web is better suited for receiving the coating adhesive.

The adhesive is heated to its optimal processing temperature in the applicator mechanism. During the coating of the laminating web, this web is joined with the substrate web immediately after having been coated. Since the coated laminating web does not come into contact with any other roller but the counterroller prior to being joined with the substrate web, the temperature of the adhesive applied will not change. The adhesive is processed in its optimal form in terms of temperature and viscosity at the connection site between the laminating web and the substrate web.

Another variant consists of coating only one laminating web, which is subsequently brought together with and joined with the substrate web, and during the joining the other side of the substrate web is lined with the adhesive. Subsequently the substrate web is brought together with and joined with a noncoated laminating web.

These different variants for applying the adhesive to the substrate web and/or laminating webs increase severalfold the number of possibilities for producing composite webs from greatly different materials. The quality of the composite webs is guaranteed because of the optimal operating conditions for all the components involved.

The process according to the present invention will be described below in greater detail on the basis of the device represented in the drawing. Both the material webs and the adhesive films are drawn in greatly exaggerated thicknesses.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
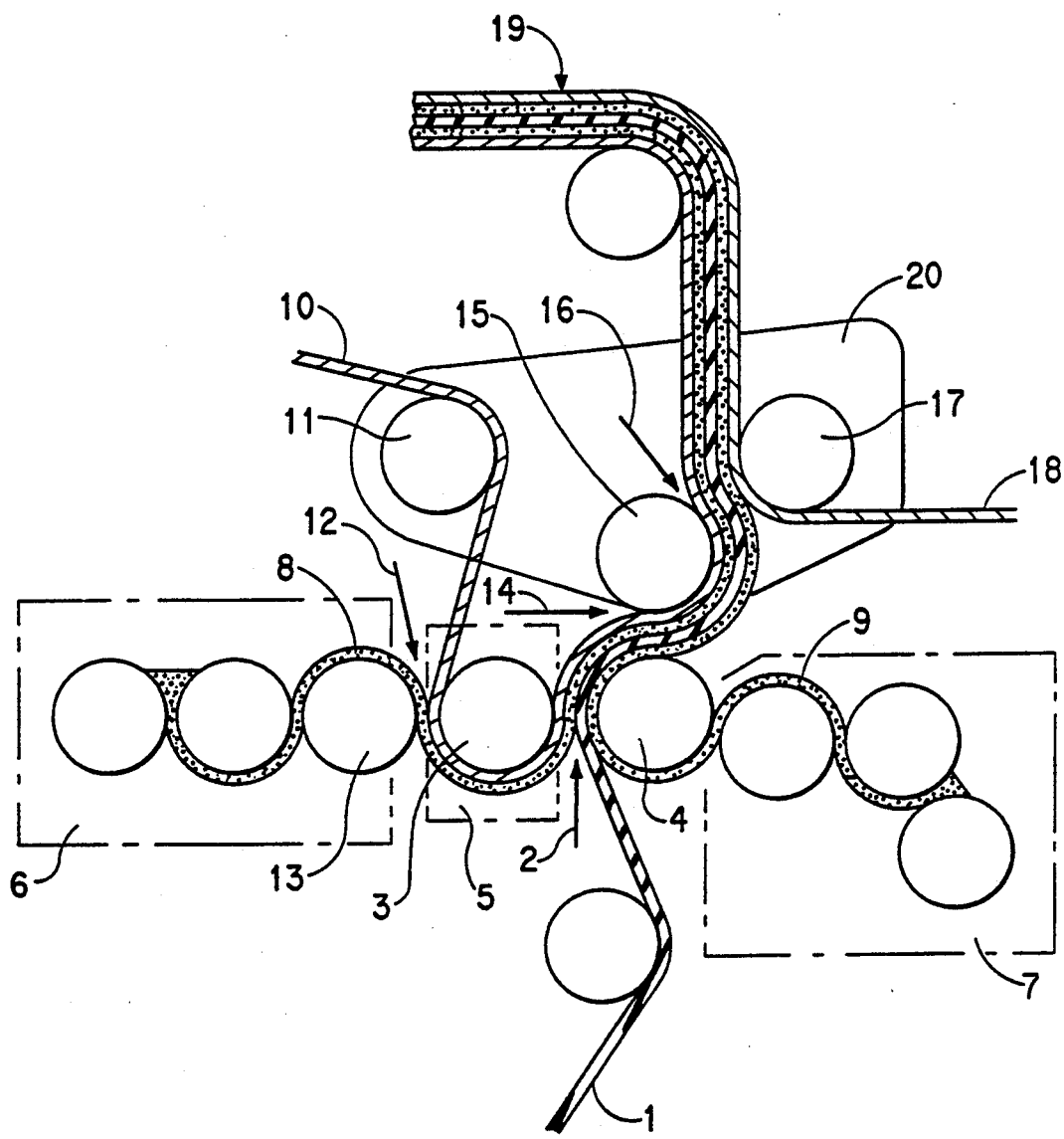
FIG. 1 is a schematic representation of the device, in which a laminating web and one side of the substrate web are coated with adhesive.

A substrate web 1 is introduced according to FIG. 1 into a counterroller gap 2, which is formed by a first counterroller 3 and a second counterroller 4. The second counterroller 4 is mounted stationarily rotatably and drivably in machine walls (not shown). The first counterroller 3 is mounted rotatably and drivably in support unit 5. The support units 5 are adjustably arranged in the machine walls, so that the first counterroller 3 can be engaged with and disengaged from the second counterroller 4. Adhesive applicator mechanisms 6 and 7 each, with which an accurately metered adhesive film 8 and 9, respectively, can be applied, can be engaged with the two counterrollers 3 and 4, respectively, in the known manner.

A laminating web 10 is introduced via a deflecting roller 11 into an adhesive roller gap 12, which is formed by the first counterroller 3 and an applicator roller 13 of the adhesive applicator mechanism 6. The laminating web 10 is coated with the adhesive film 8 delivered by the applicator roller 13 in the adhesive roller gap 12. The laminating web 10 thus coated is led around the counterroller 3, and is brought together with and joined with the substrate web 1 in the roller gap 2.

The adhesive film 9 produced and metered in the adhesive applicator mechanism 7 is received by the second counterroller 4 and is transferred by it to the substrate web 1 in the roller gap 2. The substrate web 1, which is now joined on one side with the laminating web 10 and to the adhesive film 9 on the other side, is led around the second counterroller 4 and enters the roller gap 14, which is formed by the second counterroller 4 and a first laminating roller 15. The substrate web 1, which is laminated on one side and coated on the other side, is now led around the first laminating roller 15 and introduced into a roller gap 16. The roller gap 16 is formed by the first laminating roller 15 and a second laminating roller 17.

A second laminating web 18 is introduced into the roller gap 16 around the second laminating roller 17, and is joined with and bonded to the substrate web 1 provided with the adhesive film 9. The composite web 19, which is finished after leaving the roller gap 16, is then carried away and fed, e.g., to a take-up device.

The first laminating roller 15 and the second laminating roller 17 are rotatably and drivably mounted on rockers 20 pivoted around the axis of the deflecting roller 11. The roller gap 14 can be adjusted by pivoting the rockers 20. While the first laminating roller 15 is stationarily mounted on the rockers 20, the second laminating roller 17 is adjustably mounted on the rocker 20, such that the second laminating roller 17 can be engaged with the first laminating roller 15, and the size of the roller gap 16 can be adjusted.

Figure 2:
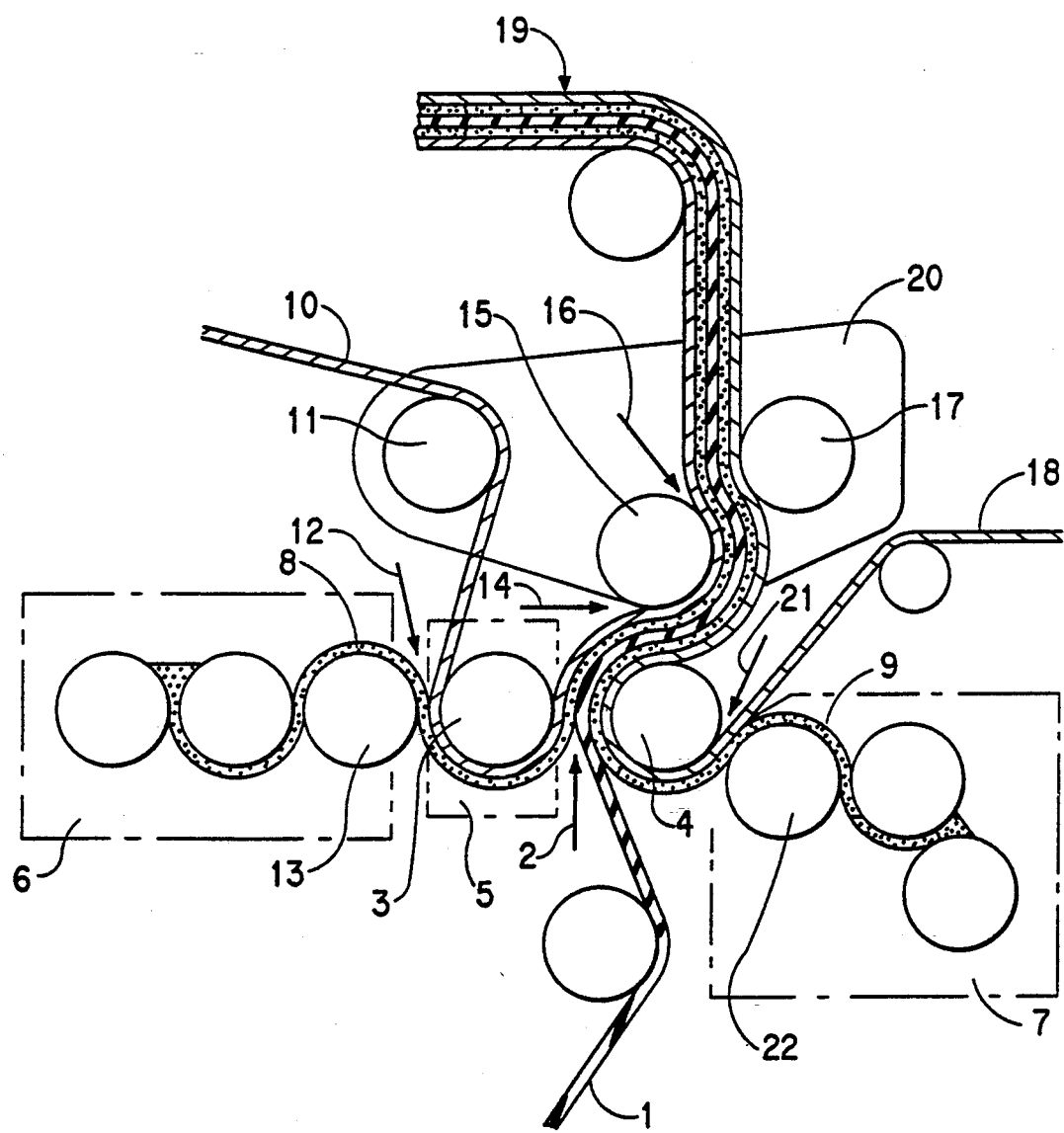
FIG. 2 is a schematic representation of the device, in which the two laminating webs are coated with adhesive and joined with the substrate web.

A device for producing a composite web analogous to that shown in FIG. 1 is also shown in FIG. 2. The substrate web 1 is again introduced into the roller gap 2 and is brought together with and joined there with a laminating web 10 provided with an adhesive film 8 according to the process shown in FIG. 1.

The laminating web 18 is introduced into a roller gap 21, which is formed by the second counterroller 4 and an applicator roller 22 of the adhesive applicator mechanism 7. The second laminating web 18 receives the adhesive film 9 from the applicator roller 22, it is introduced into the roller gap 2 around the second counterroller 4, and is joined and bonded to the substrate web there. The two-sided lamination of the substrate web 1 is carried out simultaneously by the laminating webs 10 and 18 in the roller gap 2.

The finished composite web 19 is subsequently carried away via the second counterroller 4, the roller gap 14, via the first laminating roller 15, and the roller gap 16.

For both processes, shown in FIG. 1 and FIG. 2, the two counterrollers 3 and 4 and the two laminating rollers 15 and 17 are, on one hand, driven controllably, so that independent control of the tension of the substrate web 1 and the laminating webs 10 and 18 is possible by individual speed corrections, and, on the other hand, they can be individually heated or cooled in order to guarantee optimal temperature conditions for each connection process.

The applicator rollers 13 and 22 are also driven controllably and can be heated or cooled, so that the corresponding adhesive films 8 and 9 can be "spread by rubbing" between the applicator rollers 13 and 22, respectively, and the counterrollers 3 and 4, respectively, by selecting different speeds.

Due to the mutual adjustability of the rollers which form the roller gaps 2, 12, 21, 14, and 16, it is possible to set the optimal contact pressure for the corresponding webs by appropriately adjusting the roller gaps.

The rollers that are directly involved in the composite web production process can be easily replaced, so that rollers with greatly different surfaces can be used for different web and adhesive materials. Thus, besides the optimal selection of the material, it is also possible to use greatly different structures, such as embossing, grooves, etc.

It is also possible to disengage one of the two adhesive applicator mechanisms 6 or 7, so that the substrate web 1 will be joined with a laminating web on one side only.

While a specific embodiment of the invention has been shown and described in detail to illustrate the application of the principles of the invention, it will be understood that the invention may be embodied otherwise without departing from such principles.

What is claimed is:

1. A process producing a composite web from a substrate, and a first and second laminate, the first and second laminate being joined to the substrate by first and second adhesives operating at different temperatures, the method comprising the steps of:

providing a first counterroller at a first temperature, said first temperature being an operating temperature of the first adhesive;

providing a first adhesive applicator means for applying the first adhesive at said first temperature to the first laminate, and for defining a first adhesive roller gap with said first counterroller;

feeding the first laminate through said first adhesive roller gap;

combining the first laminate with the first adhesive in said first adhesive roller gap;

providing a second counterroller at a second temperature for optimal adhesion of the second adhesive between the second laminate and the substrate, said second counterroller being adjacent said first counterroller, said second counterroller and said first counterroller defining a counterroller gap;

providing a second adhesive applicator means for applying the second adhesive to said second counterroller and for defining a second adhesive roller gap;

feeding the first laminate combined with the first adhesive around said first counterroller at said first temperature and then through said counterroller gap;

feeding the substrate through said counterroller gap;

combining in said counterroller gap a first side of the substrate with the first laminate combined with the first adhesive; and combining in said counterroller gap a second side of the substrate with the second adhesive from said second counterroller.

2. A process in accordance with claim 1, further comprising:

providing first and second laminating rollers defining a laminating roller gap, said second laminating roller being at a temperature for optimal adhesion between the second adhesive and the second laminate;

feeding the substrate combined with the first and second adhesive and the first laminate into said laminating roller gap;

feeding the second laminate into said laminating roller gap; and combining in said laminating roller gap the second laminate with the second adhesive onto the substrate, in order to form the composite web of the first and second laminates and the substrate.

3. A process for producing a composite web, the process comprising the steps of:

providing a first counterroller;

providing a first adhesive applicator means for applying a first adhesive to a first laminate, and for defining a first adhesive roller gap with said first counterroller;

feeding a first laminate with said first adhesive in said first adhesive roller gap;

combining said first laminate with said first adhesive in said first adhesive roller gap;

providing a second counterroller adjacent said first counterroller, said second counterroller and said first counterroller defining a counterroller gap;

providing a second adhesive applicator means for applying a second adhesive to said second counterroller and for defining a second adhesive roller gap;

feeding said first laminate combined with said adhesive around said first counterroller and then through said counterroller gap;

feeding a substrate through said counterroller gap;

combining in said counterroller gap a first side of said substrate with said first laminate combined with said first adhesive;

combining in said counterroller gap a second side of said substrate with said second adhesive from said second counterroller;

providing said first adhesive applicator means with an application roller, said application roller forming said first adhesive gap with said first counterroller; and heating said rollers to different predetermined temperatures for optimal operation of each of said first and second adhesives in contact with said rollers.

4. A process for producing a composite web, the apparatus comprising:

first adhesive applicator means for dispensing a first adhesive;

a first counterroller positioned adjacent said first adhesive applicator means and defining a first adhesive gap with said first adhesive applicator;

first feeding means for feeding a first laminate into said first adhesive gap and combining said first laminate with said first adhesive;

a second counterroller positioned adjacent said first counterroller and defining a counterroller gap;

a second adhesive applicator means for dispensing a second adhesive onto said second counterroller and defining a second adhesive gap means;

second feeding means for feeding said first laminate combined with said first adhesive around said first counterroller and into said counterroller gap, said second feeding means also feeding a substrate into said counterroller gap and combining a first side of said substrate with said first laminate and said first adhesive, said second feeding means also combining a second side of said substrate with said second adhesive from said second counterroller; and temperature control means for controlling a first temperature of said first adhesive from said first adhesive applicator means to said counterroller gap, said first temperature being of a value for optimal adhesion between said first laminate and said substrate, said temperature control means also for controlling a second temperature of said second adhesive from said second adhesive applicator means to said counterroller gap, said second temperature being of a value for optimal adhesion between said second laminate and said substrate.

5. An apparatus in accordance with claim 4, wherein:

said second adhesive applicator means has an application roller for dispensing of said second adhesive, said first adhesive applicator means has an application roller for said dispensing of said first adhesive; and said temperature control means contains first heating means for heating one of said first adhesive application means, said first counterroller and said application roller of said first adhesive applicator means to said first temperature, said temperature control means also containing second heating means for heating one of said second adhesive application means, said second counterroller and said application roller of said second adhesive applicator means to said second temperature.

* * * * *